United States Patent [19]
Nosu et al.

[11] Patent Number: 5,464,896
[45] Date of Patent: * Nov. 7, 1995

[54] STABILIZED, HALOGEN-CONTAINING RESIN COMPOSITION

[75] Inventors: Tsutomu Nosu, Kagawa; Yoshiyuki Nagae, both of Kagawa, Japan

[73] Assignee: Kyowa Chemical Industry Co., Ltd., Kagawa, Japan

[*] Notice: The portion of the term of this patent subsequent to Oct. 12, 2010, has been disclaimed.

[21] Appl. No.: 162,303

[22] Filed: Dec. 6, 1993

Related U.S. Application Data

[63] Continuation-in-part of Ser. No. 907,230, Jul. 1, 1992, abandoned.

[30] Foreign Application Priority Data

Jul. 5, 1991 [JP] Japan .................................. 3-192440

[51] Int. Cl.$^6$ .................................................. C08K 3/26
[52] U.S. Cl. ...................... 524/436; 524/434; 524/180; 524/399
[58] Field of Search .................... 524/434, 424, 524/425, 436

[56] References Cited

U.S. PATENT DOCUMENTS

| | | | |
|---|---|---|---|
| 4,675,356 | 6/1987 | Miyata | 524/424 |
| 4,861,816 | 8/1989 | Kobayashi et al. | 524/204 |
| 5,252,645 | 10/1993 | Nosu et al. | 524/436 |

FOREIGN PATENT DOCUMENTS

| | | |
|---|---|---|
| 0489545 | 6/1992 | European Pat. Off. . |
| 58-152941 | 8/1984 | Japan . |
| 60-203657 | 10/1985 | Japan . |
| 3-103451 | 4/1991 | Japan . |

*Primary Examiner*—Veronica P. Hoke
*Attorney, Agent, or Firm*—Wenderoth, Lind & Ponack

[57] ABSTRACT

A stabilized halogen-containing resin composition contains 100 parts by weight of a halogenated polymer of an ethylenically unsaturated monomer, 0.01 to 5 parts by weight of at least one member selected from a perchloric acid-containing hydrotalcite compound and perchloric acid salt, and 0.01 to 10 parts by weight of a hydrotalcite compound prepared by removing crystal water therefrom under heat. The stabilized, halogen-containing resin composition is excellent in heat stability and gives molded articles free from deterioration in color tone.

3 Claims, 1 Drawing Sheet

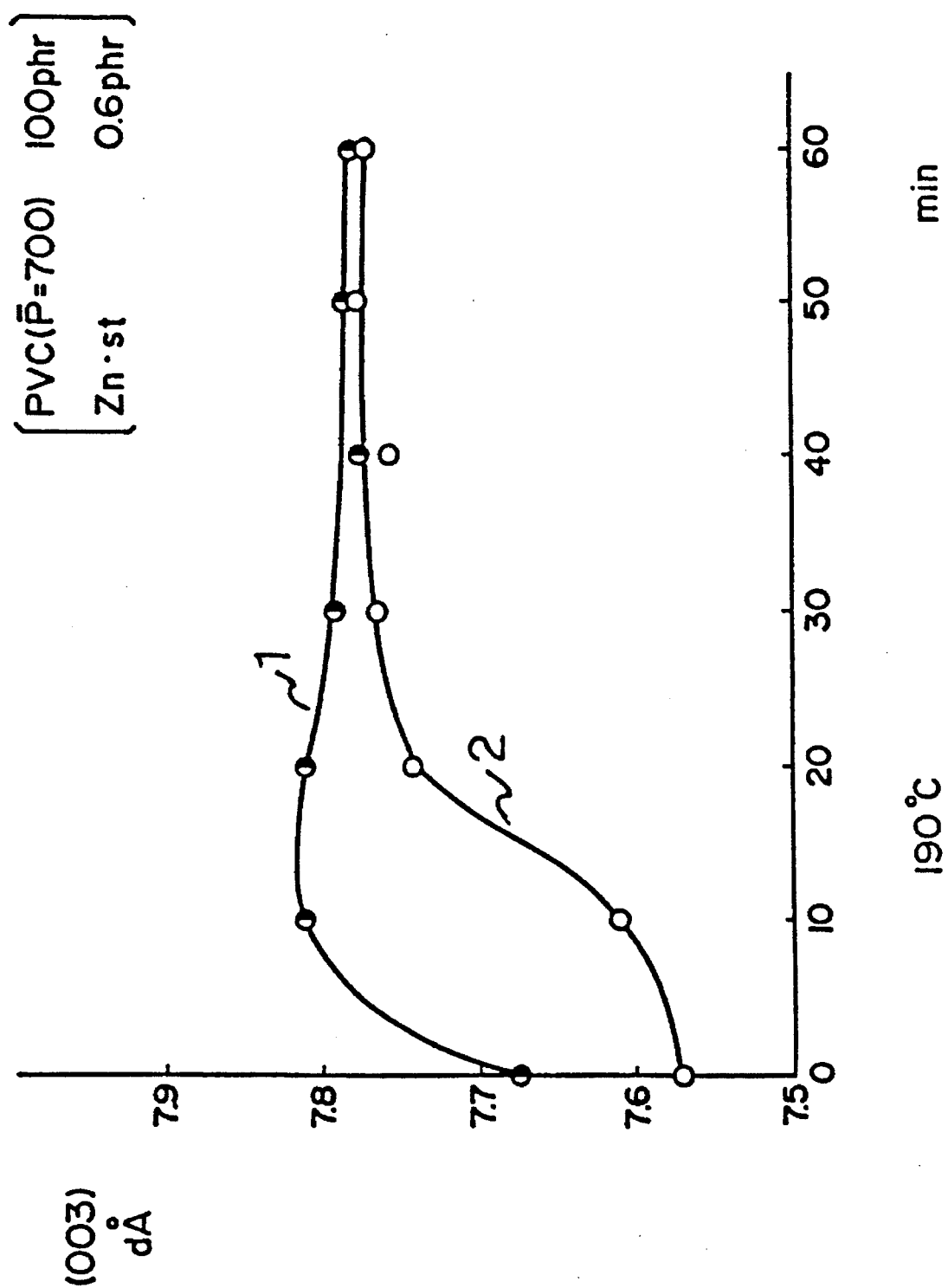

STABILIZED, HALOGEN-CONTAINING RESIN COMPOSITION

This application is a continuation-in-part of now abandoned patent application Ser. No. 07/907,230 filed Jul. 1, 1992.

FIELD OF THE INVENTION

The present invention relates to a stabilized, halogen-containing resin composition. More specifically, it relates to a stabilized, halogen-containing resin composition comprising a halogen-containing resin, a predetermined amount of a perchloric acid-containing hydrotalcite compound and/or perchloric acid salt, and predetermined amount of a hydrotalcite compound whose crystal water is removed under heat (to be sometimes referred to as "heat-treated HT" hereinafter),

PRIOR ART

A halogen-containing resin is inherently thermally unstable. For example, a halogen-containing resin undergoes a decomposition reaction mainly caused by dehydrohalogenation due to heat when molded or an increase in a surface temperature caused by sun light when a molded article therefrom is used. For this reason, a molded article of a halogen-containing resin deteriorates in mechanical properties or color tone. To cope with these disadvantages, there has been proposed a method in which one or more heat stabilizers are incorporated into a halogen-containing resin to prevent the deterioration at a molding step, etc.

For example, there is a method in which organic acid metal salts are used as the above heat stabilizers the result obtained by this method is satisfactory to some extent. Since, however, most of these heat stabilizers contain salts of heavy metals such as cadmium and lead, there arises a problem of toxicity.

The use of hydrotalcites has been recently proposed (Japanese Patent Publication No. 46146/1983). Hydrotalcite compounds are excellent in halogen-seizing capability and have advantages that they capture halogen into their structures and are harmless. Hydrotalcite compounds are effective for tile prevention of deterioration of mechanical properties of a molded article. However, hydrotalcite compounds have a problem in that they cause coloring of a halogen-containing resin due to heat at a molding step or when a molded article is used.

In order to prevent above coloring, there has been proposed a resin composition obtained by incorporating an organic acid metal salt or an organic tin compound into a halogen-containing resin containing a hydrotalcite compound. However, this resin composition has not yet been satisfactory in view of coloring.

SUMMARY OF THE INVENTION

It is an object of the present invention to provide a stabilized halogen-containing resin composition in which the heat stability of the halogen-containing resin is improved.

It is another object of the present invention to provide a stabilized halogen-containing resin composition which is free from deterioration in color tone when molded or which gives a molded article which is free from deterioration in color tone when used.

According to the present invention, there is provided a stabilized halogen-containing resin composition comprising 100 parts by weight of a halogenated polymer of an ethylenically unsaturated monomer, 0.01 to 5 parts by weight, preferably 0.1 to 2 parts by weight, of at least one selected from a perchloric acid-containing hydrotalcite compound of the following formula (2) and perchloric acid salt, and 0.01 to 10 parts by weight, preferably 0.1 to 5 parts by weight, of a hydrotalcite compound prepared by removing crystal water of a compound of the formula (1) under heat,

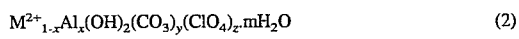

$$M^{2+}_{1-x}Al_x(OH)_2(CO_3)_y(ClO_4)_z \cdot mH_2O \qquad (2)$$

wherein $M^{2+}$ is $Mg^{2+}$ and/or $Zn^{2+}$, x is defined by $0<x<0.5$, y is defined by $0<y<0.25$, z is defined by $0<z\leq0.5$, x, y and z satisfy the relationship of $2y+z=x$, and m is defined by $0\leq m<1$,

$$M^{2+}_{1-x}Al_x(OH)_2(CO_3)_{x/2} \cdot mH_2O \qquad (1)$$

wherein $M^{2+}$ is $Mg^{2+}$ and/or $Zn^{2+}$, x is defined by $0.1<x<0.5$, and m is defined by $0<m<1$.

Further, according to the present invention, there is also provided a stabilized halogen-containing resin composition which further contains 0.01 to 10 parts by weight, preferably 0.1 to 5 parts by weight, per 100 parts by weight of the halogenated polymer of an ethylenically unsaturated monomer, of an organic tin compound and/or an organic acid metal salt.

BRIEF DESCRIPTION OF THE DRAWINGS

The sole FIGURE of drawing shows the ion-exchange rate of each of hydrotalcite whose crystal water is removed under heat and hydrotalcite which is not yet heated.

DETAILED DESCRIPTION OF THE INVENTION

The present inventors have made a diligent study to overcome the problems of hydrotalcite compounds having excellent halogen-seizing capability when the hydrotalcite compounds are used as a stabilizer for a halogen-containing resin. As a result, it has been found that the above problems can be overcome by the use, as a stabilizer, of a hydrotalcite compound whose crystal water is removed under heat and either a perchloric acid-containing hydrotalcite compound or perchloric acid salt.

The hydrotalcite compound whose crystal water is removed, used in the present invention, is obtained by heating a compound of the formula (1),

$$M^{2+}_{1-x}Al_x(OH)_2(CO_3)_{x/2} \cdot mH_2O \qquad (1)$$

wherein $M^{2+}$ is $Mg^{2+}$ and/or $Zn^{2+}$, x is defined by $0.1<x<0.5$, preferably $0.2<x<0.4$, and m is defined by $0<m<1$, at a temperature between 170° C. and 350° C., preferably between 200° C. and 300° C. to remove its crystal water. When the heating temperature is lower than 170° C., it takes a long time to remove the crystal water under heat. When it is higher than 300° C., the hydrotalcite crystal per se is liable to be destroyed, and it is liable to be difficult to adjust the heating time.

The heat-treated HT used in the present invention is obtained by removing interlayer crystal water of a hydrotalcite compound by drying and heating it. In the present invention, the use of the heat-treated HT as a stabilizer for a halogen-containing resin remarkably improves the prevention of coloring of a molded article of the halogen-containing resin. The reason therefor is presumably that hydrogen halide generated by decomposition of a halogen-containing resin due to heat at its molding time and due to heat and light from the sun at a time of use of a molded article thereof is captured into interlayer spaces of the heat-treated HT more rapidly than it is captured into those of any conventional hydrotalcite. That is, due to the removal of crystal water present in interlayer spaces of the hydrotalcite compound, hydrogen halide undergoes an ion-exchange reaction with carbonate ion without being hampered by crystal water.

In the present invention, at least one of a perchloric acid-containing hydrotalcite compound and perchloric acid salt is incorporated into a halogen-containing resin in addition to the heat-treated HT, whereby the prevention of coloring can be further enhanced.

The perchloric acid-containing hydrotalcite compound used in the present invention is a compound of the formula (2),

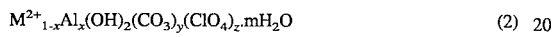

$$M^{2+}{}_{1-x}Al_x(OH)_2(CO_3)_y(ClO_4)_z \cdot mH_2O \qquad (2)$$

wherein $M^{2+}$ is $Mg^2$ and/or $Zn^{2+}$, x is defined by $0<x<0.5$, preferably by $0.2 \leq x \leq 0.4$, y is defined by $0<y<0.25$, preferably by $0<y \leq 0.20$, z is defined by $0<z \leq 0.5$, preferably by $0.05 \leq z \leq 0.4$, x, y and z satisfy the relationship of $2y+z=x$, and m is defined by $0 \leq m<1$.

The perchloric acid-containing hydrotalcite compound can be easily produced by mixing perchloric acid with a slurry of a hydrotalcite compound. When mixed, perchlorate ion and carbonate ion undergo an ion-exchange reaction. As the perchloric acid, commercially available ones may be used directly or after they are diluted as required.

The perchloric acid salt used in the present invention includes salts of metals such as Li, Na, K, Mg, Ca, Sr, Ba, Zn and Al and salt of $NH_4$.

Perchlorate ion is liable to promote the thermal decomposition of polyvinyl chloride when polyvinyl chloride is processed. However, when perchlorate ion is used in combination with a hydrotalcite compound whose crystal water has been removed under heat, a halogen-containing resin is remarkably improved in heat stability, and the prevention of coloring is unexpectedly improved as compared with the use of any conventional hydrotalcite compound, although the reasons for these results are not clear.

The halogen-containing resin composition of the present invention may further contain one or more of the following organic tin compounds and organic acid metal salts as additives.

Examples of the organic tin compounds include dibutyltinlaurate, dioctyltinlaurate, dibutyltinmaleate, dibutyltinmaleate, dibutyltinmelcaptoacetate, monobutyltinmercaptoacetate, dibutyltinisooctylthioglycolate, dicotyltinmercaptoacetate, monooctyltinmercaptoacetate, dioctyltinisooctylthioglycolate and monooctyltinisooctylthioglycolate.

Examples of metals as components of the organic acid metal salts include Li, Na, K, big, Ca, Sr, Ba, Zn, Cd and Pb. Examples of the organic acid moieties include moieties of carboxylic acids and phenols. Examples of the carboxylic acids include acetic acid, propionic acid, caprylic acid, 2-ethylhexonic acid, lauric acid, stearic acid, isostearic acid, 12-hydroxystearic acid, oleic acid, linoleic acid, linolenic acid, glycolic acid, lactic acid, hydroxyacrylic acid, α-oxyacetic acid, glyceric acid, malic acid, tartaric acid, citric acid, thioglycolic acid, mereaptopropionic acid, laurylmercaptopropionic acid, benzoic acid, p-tert-butylbenzoic acid, dimethylbenzoic acid, aminobenzoic acid, salicylic acid, aminoacetic acid, glutamic acid, oxalic acid, succinic acid, adipic acid, phthalic acid, maleic acid and thiodipropionic acid. Examples of the phenols include phenol, nonylphenol, tert-butylphenol, octylphenol, isoamylphenol, cresol and xylenol.

Examples of the halogen-containing resin used in the present invention includes halogen-containing resins such as polyvinyl chloride, polyvinyl bromide, polyvinyl fluoride, polyvinylidene chloride, chlorinated polyethylene, chlorinated polypropylene, brominated polyethylene, chlorinated rubber, a vinyl chloride-vinyl acetate copolymer, a vinyl chloride-ethylene copolymer, a vinyl chloride-propylene copolymer, a vinyl chloride-styrene copolymer, a vinyl chloride-isobutylene copolymer, a vinyl chloride-vinylidene chloride copolymer, a vinyl chloride-styrene-acrylonitrile copolymer, a vinyl chloride-butadiene copolymer, a vinyl chloride-chlorinated propylene copolymer, a vinyl chloride-vinyl idene chloride-vinyl acetate terpolymer, a vinyl chloride-maleic acid ester copolymer, a vinyl chloride-methacrylic acid copolymer, a vinyl chloride-methacrylic acid ester copolymer, a vinyl chloride-acrylonitrile copolymer and internally plasticized polyvinyl chloride; and a blend of any one of the above halogen-containing resins with an α-olefin copolymer such as polyethylene or polypropylene a polyolefin from ethylene or propylene, a copolymer of these such as an ethylenepropylene copolymer, a copolymer of any one of polystyrene, an acrylic resin and styrene and other monomer, an acrylonitrile-butadiene-styrene copolymer, an acrylic acid ester-butadiene-styrene copolymer, or a methacrylic acid ester-butadiene-styrene copolymer.

Further, the halogen-containing resin composition of the present invention may additionally contain an antioxidant, a light stabilizer, an ultraviolet light absorbent, a crosslinking agent, a pigment, a filler, a foaming agent, an antistatic agent, an anti-fogging agent, a plasticizer, a plate-out preventer, a surface-treating agent, a lubricant, a flame retardant, a fluorescent agent, a mildew preventer, a fungicide, a metal deactivator, an optical deterioration preventer, a processing auxiliary, mold release agent and a reinforcement agent.

The present invention provides a halogen-containing resin composition which is free from coloring caused by heat when molded and gives a molded article free from coloring caused by heat when the molded article is used. The present invention also provides a halogen-containing resin composition which gives a molded article free from mechanical deterioration caused by heat when the composition is molded and when it is used. The present invention further provides a halogen-containing resin composition which is free from coloring and mechanical deterioration caused by heat at a high temperature when molded and gives a molded article free from coloring and mechanical deterioration caused by heat at a relatively low temperature when the molded article is used The present invention will be explained further in detail hereinafter by reference to Examples, in which "%" and "part" stand for "% by weight" and "part by weight" unless otherwise specified.

The conditions for producing heat-treated HTs used in the Examples are as shown in Table 1.

TABLE 1

| Sample | Heating temperature | Weight Loss | Hydrotalcite before treatment |
|--------|---------------------|-------------|-------------------------------|
| A | 200° C. | 6.0% | $Mg_4Al_2(OH)_{12}CO_3 \cdot 3H_2O$ |

TABLE 1-continued

| Sample | Heating temperature | Weight Loss | Hydrotalcite before treatment |
|---|---|---|---|
| B | 250° C. | 4.4% | " |
| C | 250° C. | 13.5% | " |
| D | 300° C. | 17.8% | " |
| E | 250° C. | 13.8% | $Mg_3ZnAl_2(OH)_{12}CO_3\cdot 3H_2O$ |

Perchloric acid-containing hydrotalcites were prepared by mixing perchloric acid in slurries of hydrotalcites, whereby carbonate ion and perchlorate ion underwent an ion-exchange reaction. Perchloric acid-containing hydrotalcites used in Examples are as shown in Table 2.

TABLE 2

| Sample | Chemical formula |
|---|---|
| F | $Mg_3ZnAl_2(OH)_{12}(CO_3)_{0.4}(ClO_4)_{1.2}\cdot 3H_2O$ |
| G | $Mg_3ZnAl_2(OH)_{12}(ClO_4)_{2.0}\cdot 3H_2O$ |
| H | $Mg_4Al_2(OH)_{12}(CO_3)_{0.4}(ClO_4)_{1.2}\cdot 3H_2O$ |
| I | $Mg_4Al_2(OH)_{12}(ClO_4)_{2.0}\cdot 3H_2O$ |

The numbers showing degrees of coloring in the Tables below mean the following. Any number between the two neighboring numbers below shows a degree of coloring between the degrees of coloring shown by such two numbers.

0: colorless
2: yellowish
4: yellow
6: yellowish brown
8: reddish brown
10: black Comparison of heat-treated HT and hydrotalcite before heat treatment in heat stability and coloring:

A resin composition containing the following components was kneaded with a roll at 180° C. for 3 minutes to obtain test sheets having a thickness of 0.7 mm.

| | |
|---|---|
| Polyvinyl chloride (polymerization degree 700) | 100 parts |
| Zinc stearate | 0.6 part |
| Sample C | 2.0 parts |

More than 10 test sheets having a length of 5 cm and a width of 4 cm were suspended in a gear oven at 190° C., and sampled every 10 minutes. The sampled test sheets were measured for a degree of coloring and a change in the (003) face on the basis of diffraction X ray. The test sheet was also measured for a time taken before it was blackened. As a comparison, the above procedures were repeated except that the Sample C was replaced with hydrotalcite which had not been heat-treated ($Mg_4Al_2(OH)_{12}CO_3\cdot 3H_2O$).

Table 3 and the FIGURE shows the results (degrees of coloring and times taken before the test sheets were blackened).

TABLE 3

| | Passage of time (minute) | | | | | | Time required |
|---|---|---|---|---|---|---|---|
| | 0 | 10 | 20 | 30 | 40 | 50 | for blackening |
| Sample C | 0 | 1 | 3 | 7 | 8 | 9 | 60 minutes |

TABLE 3-continued

| | Passage of time (minute) | | | | | | Time required |
|---|---|---|---|---|---|---|---|
| | 0 | 10 | 20 | 30 | 40 | 50 | for blackening |
| Hydrotalcite before heat treatment | 4 | 5 | 6 | 6 | 7 | 8 | 70 minutes |

As shown in the FIGURE, the interlayer distance of the heat-treated HT increased more rapidly than that of the hydrotalcite which had not been heat treated. This phenomenon shows that hydrogen halide generated by decomposition of polyvinyl chloride undergoes an ion-exchange reaction with carbonate radical and chloride ion enters interlayer spaces rapidly.

In the FIGURE, numeral 1 indicates the ion-exchange rate of heat-treated HT, and numeral 2 indicates the ion-exchange rate of hydrotalcite which was not heat-treated.

Example 1 and Comparative Example 1

A resin composition containing the following components was kneaded with a roll at 170° C. for 5 minutes to obtain a roll sheet having a thickness of 0.7 mm.

| | |
|---|---|
| Polyvinyl chloride (polymerization degree 1,300) | 100 parts |
| Dioctyl phthalate | 50 parts |
| Epoxidized soybean oil | 2 parts |
| Zinc stearate | 0.3 part |
| Barium stearate | 0.5 part |
| Sample F | 0.5 part |
| One of Samples A to E | 1.0 part |

More than 10 test sheets having a length of 5 cm and a width of 4 cm were prepared from the roll sheet, and the test sheets were suspended in a gear oven at 190° C., and sampled every 10 minutes. The sampled test sheets were measured for a degree of coloring, and the test sheet was also measured for a time taken before it was blackened. For comparison, the above procedures were also repeated except that "One of the Samples A to E" was replaced with hydrotalcite which had not been heat-treated. Table 4 shows the results.

TABLE 4

| | Test sample | Passage of time (minute) | | | | |
|---|---|---|---|---|---|---|
| | | 0 | 10 | 20 | 40 | 60 |
| Example | | | | | | |
| 1-1 | Sample A | 0 | 1 | 2 | 2 | 3 |
| 1-2 | Sample B | 0 | 1 | 2 | 4 | 4 |
| 1-3 | Sample C | 0 | 0 | 1 | 2 | 1 |
| 1-4 | Sample D | 0 | 0 | 2 | 4 | 4 |
| 1-5 | Sample E | 0 | 0 | 1 | 1 | 1 |
| Comparative Example | | | | | | |
| 1-1 | X* | 1 | 2 | 3 | 6 | 6 |
| 1-2 | Y* | 1 | 2 | 3 | 5 | 5 |

Notes:
X*: $Mg_4Al_2(OH)_{12}CO_3\cdot 3H_2O$
Y*: $Mg_3ZnAl_2(OH)_{12}CO_3\cdot 3H_2O$

| | Test sample | Passage of time (minute) | | | Time required |
|---|---|---|---|---|---|
| | | 80 | 100 | 120 | for blackening |
| Example | | | | | |

TABLE 4-continued

| | | | | | |
|---|---|---|---|---|---|
| 1-1 | Sample A | 3 | 3 | 3 | 140 minutes |
| 1-2 | Sample B | 4 | 4 | 5 | 140 minutes |
| 1-3 | Sample C | 2 | 2 | 2 | 140 minutes |
| 1-4 | Sample D | 4 | 4 | 5 | 140 minutes |
| 1-5 | Sample E | 2 | 2 | 3 | 140 minutes |
| Comparative Example | | | | | |
| 1-1 | X* | 6 | 6 | 7 | 140 minutes |
| 1-2 | Y* | 6 | 6 | 6 | 140 minutes |

Notes:
X*: $Mg_4Al_2(OH)_{12}CO_3 \cdot 3H_2O$
Y*: $Mg_3ZnAl_2(OH)_{12}CO_3 \cdot 3H_2O$

Example 2 and Comparitive Example 2

Foamed polyurethane having a thickness of 10 mm was press-bonded to each of the roll sheets obtained in Example 1 at 180° C. for 3 minutes. More than 20 test pieces having a length of 5 cm and a width of 4 cm were prepared from each of the so-prepared, urethane-bonded roll sheets. These test pieces were suspended in a gear oven at 120° C., and sampled every day. The sampled test pieces were measured for a degree of coloring, and the test piece was also measured for a time taken before it was blackened. For comparison, the above procedures were also repeated on the roll sheets obtained in Comparative Example 1. Table 5 shows the results.

TABLE 5

| | | Passage of time (days) | | | | | |
|---|---|---|---|---|---|---|---|
| | Sample | 0 | 2 | 4 | 6 | 8 | 10 |
| Example | | | | | | | |
| 2-1 | A | 0 | 1 | 3 | 4 | 4 | 4 |
| 2-2 | B | 0 | 1 | 5 | 5 | 6 | 6 |
| 2-3 | C | 0 | 1 | 2 | 2 | 2 | 2 |
| 2-4 | D | 0 | 1 | 3 | 5 | 6 | 6 |
| 2-5 | E | 0 | 1 | 2 | 2 | 3 | 3 |
| Comparative Example | | | | | | | |
| 2-1 | X* | 1 | 4 | 6 | 7 | 7 | 7 |
| 2-2 | Y* | 1 | 4 | 6 | 6 | 6 | 7 |

Notes:
X*: $Mg_4Al_2(OH)_{12}CO_3 \cdot 3H_2O$
Y*: $Mg_3ZnAl_2(OH)_{12}CO_3 \cdot 3H_2O$

| | | Passage of time (days) | | | | | Days required |
|---|---|---|---|---|---|---|---|
| | Sample | 12 | 14 | 16 | 18 | 20 | for blackening |
| Example | | | | | | | |
| 2-1 | A | 5 | 5 | 6 | 6 | 6 | 23 days |
| 2-2 | B | 6 | 6 | 8 | 8 | 10 | 20 days |
| 2-3 | c | 3 | 3 | 3 | 3 | 3 | 25 days |
| 2-4 | D | 6 | 6 | 8 | 8 | 10 | 20 days |
| 2-5 | E | 3 | 5 | 5 | 6 | 6 | 23 days |
| Comparative Example | | | | | | | |
| 2-1 | X* | 7 | 8 | 8 | 10 | | 18 days |
| 2-2 | Y* | 7 | 7 | 7 | 8 | 10 | 20 days |

TABLE 5-continued

Notes:
X*: $Mg_4Al_2(OH)_{12}CO_3 \cdot 3H_2O$
Y*: $Mg_3ZnAl_2(OH)_{12}CO_3 \cdot 3H_2O$

Example 3 and Comparative Example 3

A resin composition containing the following components was kneaded with a roll at 180° C. for 5 minutes to obtain a roll sheet having a thickness of 0.7 mm.

| | |
|---|---|
| Polyvinyl chloride (polymerization degree 700) | 50 parts |
| ABS resin | 50 parts |
| Dioctyltindimaleate polymer | 1.0 part |
| Sample C | 0.5 part |
| Glycerin monostearate | 0.8 part |
| Wax OP (supplied by Hoechst) | 0.4 part |
| One of Samples F to H | 0.5 part |
| Zinc stearate | 0.05 part |

More than 10 test sheets having a length of 3 cm and a width of 3 cm were prepared from the roll sheet, and the test sheets were placed on a rotary desk in a gear oven at 200° C., and sampled every 10 minutes. The sampled test sheets were measured for a degree of coloring, and the test sheet was also measured for a time taken before it was blackened. For comparison, the above procedures were also repeated except that the Sample C was replaced with hydrotalcite which had not been heat-treated.

TABLE 6

| | | Passage of time (minute) | | | | |
|---|---|---|---|---|---|---|
| | Sample | 0 | 10 | 20 | 30 | 40 |
| Example | | | | | | |
| 3-1 | F | 0 | 1 | 2 | 2 | 2 |
| 3-2 | G | 0 | 1 | 1 | 1 | 2 |
| 3-3 | H | 0 | 1 | 2 | 3 | 3 |
| Comparative Example | | | | | | |
| 3-1 | F | 1 | 3 | 3 | 3 | 6 |
| 3-2 | G | 1 | 3 | 3 | 3 | 6 |
| 3-2 | H | 1 | 3 | 3 | 4 | 6 |

| | | Passage of time (minutes) | | Time required for blackening |
|---|---|---|---|---|
| | Sample | 50 | 60 | (minute) |
| Example | | | | |
| 3-1 | F | 3 | 6 | 70 |
| 3-2 | G | 6 | 10 | 60 |
| 3-3 | H | 3 | 6 | 70 |
| Comparative Example | | | | |
| 3-1 | F | 8 | 10 | 60 |
| 3-2 | G | 10 | | 50 |
| 3-3 | H | 8 | 10 | 60 |

Example 4 and Comparative Example 4

A resin composition containing the following components was kneaded with a roll at 170° C. for 5 minutes to obtain a roll sheet having a thickness of 0.7 mm.

| | |
|---|---|
| Polyvinyl chloride (polymerization degree 1300) | 100 parts |
| Dioctyl phthalate | 50 parts |
| Pentaerythritol | 0.5 part |
| Ricinoleic acid | 0.5 part |
| Zinc octylate | 0.3 part |
| Glycerin monostearate | 0.8 part |
| Wax OP | 0.4 part |
| Barium perchlorate | 0.5 part |
| One of Samples C and E | 1.0 part |

Foamed polyurethane having a thickness of 10 mm was press-bonded to each of the roll sheets at 180° C. for 3 minutes. More than 20 test pieces having a length of 5 cm and a width of 4 cm were prepared from each of the so-prepared, urethane-bonded roll sheets. These test pieces were suspended in a gear oven at 120° C., and sampled every day. The sampled test pieces were measured for a degree of coloring, and the test piece was also measured for a time taken before it was blackened. For comparison, the above procedures were also repeated except that "One of Samples C and E" was replaced with hydrotalcite which had not been heat-treated or a commercially available barium.zinc stabilizer. Table 7 shows the results.

TABLE 7

| | Sample | Passage of time (days) | | | | | |
|---|---|---|---|---|---|---|---|
| | | 0 | 2 | 4 | 6 | 8 | 10 |
| Example | | | | | | | |
| 4-1 | C | 0 | 1 | 2 | 2 | 3 | 3 |
| 4-2 | E | 0 | 1 | 1 | 2 | 3 | 3 |
| Comparative Example | | | | | | | |
| 4-2 | 1* | 0 | 1 | 10 | | | |
| 4-2 | X* | 1 | 2 | 4 | 6 | 6 | 8 |
| 4-3 | Y* | 1 | 2 | 2 | 6 | 6 | 8 |

Notes: 1*: Commercially available barium.zinc stabilizer
X*: $Mg_4Al_2(OH)_{12}CO_3 \cdot 3H_2O$
Y*: $Mg_3ZnAl_2(OH)_{12}CO_3 \cdot 3H_2O$

| | Sample | Passage of time (days) | | | Days required for blackening |
|---|---|---|---|---|---|
| | | 12 | 14 | 16 | |
| Example | | | | | |
| 4-1 | C | 6 | 6 | 10 | 16 days |
| 4-2 | E | 6 | 10 | | 14 days |
| Comparative Example | | | | | |
| 4-1 | 1* | 10 | | | 4 days |
| 4-2 | X* | 10 | | | 12 days |
| 4-3 | Y* | 10 | | | 12 days |

Notes: 1*: Commercially available barium.zinc stabilizer
X*: $Mg_4Al_2(OH)_{12}CO_3 \cdot 3H_2O$
Y*: $Mg_3ZnAl_2(OH)_{12}CO_3 \cdot 3H_2O$

Example 5 and Comparative Example 5

A resin composition containing the following components was kneaded with a roll at 170° C. for 5 minutes to obtain a roll sheet having a thickness of 0.7 mm.

| | |
|---|---|
| Polyvinyl chloride (polymerization degree 1300) | 100 parts |
| Dioctyl phthalate | 50 parts |
| Barium stearate | 0.5 part |
| Zinc stearate | 0.5 part |
| Sample C | 1.0 part |
| Samples H | 1.0 part |

Foamed polyurethane having a thickness of 10 mm was press-bonded to the roll sheet at 180° C. for 3 minutes. More than 20 test pieces having a length of 5 cm and a width of 4 cm were prepared from each of the so-prepared, urethane-bonded roll sheet. These test pieces were suspended in a gear oven at 180° C., and sampled every day. The sampled test pieces were measured for a degree of coloring, and the test piece was also measured for a time taken before it was blackened. For comparison, the above procedures were also repeated except that the combination of Samples were changed as shown in Table 8. Table 8 shows the results.

TABLE 8

| | Samples | Passage of time (days) | | | | | | |
|---|---|---|---|---|---|---|---|---|
| | | 0 | 2 | 5 | 7 | 9 | 11 | 13 |
| Example | | | | | | | | |
| 5 | C-H | 0 | 4 | 4 | 4 | 5 | 5 | 7 |
| Comparative Example | | | | | | | | |
| 5-1 | X-X | 0 | 10 | | | | | |
| 5-2 | C-C | 0 | 7 | 10 | | | | |
| 5-3 | I-I | 0 | 7 | 10 | | | | |
| 5-4 | H-H | 0 | 6 | 7 | 8 | 10 | | |
| 5-5 | X-I | 1 | 6 | 7 | 7 | 8 | 9 | 10 |
| 5-6 | X-H | 1 | 6 | 7 | 7 | 8 | 9 | 10 |
| 5-7 | C-I | 0 | 3 | 4 | 6 | 7 | 8 | 9 |

| | Samples | Passage of time (days) | | | Days required for blackening |
|---|---|---|---|---|---|
| | | 15 | 17 | 19 | |
| Example | | | | | |
| 5 | C-H | 9 | 9 | 10 | 19 days |
| Comparative Example | | | | | |
| 5-1 | X-X | | | | 2 days |
| 5-2 | C-C | | | | 4 days |
| 5-3 | I-I | | | | 5 days |
| 5-4 | H-H | | | | 9 days |
| 5-5 | X-I | | | | 13 days |
| 5-6 | X-H | | | | 13 days |
| 5-7 | C-I | 10 | | | 15 days |

X*: $Mg_4Al_2(OH)_{12}CO_3 \cdot 3H_2O$

What is claimed is:

1. A stabilized halogen-containing resin composition comprising 100 parts by weight of a halogenated polymer of an ethylenically unsaturated monomer, 0.01 to 5 parts by weight of a perchloric acid-containing hydrotalcite compound of the following formula (2), and 0.01 to 10 parts by weight of a hydrotalcite compound prepared by removing crystal water of a compound of the formula (1) under heat, $$M^{2+}{}_{1-x}Al_x(OH)_2(CO_3)_y(ClO_4)_z \cdot mH_2O \quad (2)$$

wherein $M^{2+}$ is $Mg^2$ and/or $Zn^{2+}$, x is defined by $0<x<0.5$, y is defined by $0<y<0.25$, z is defined by $0<z\leq0.5$, x, y and z satisfy the relationship of $2y+z=x$, and m is defined by $0\leq m<1$, $$M^{2+}{}_{1-x}Al_x(OH)_2(CO_3)_{x/2} \cdot mH_2O \quad (1)$$

wherein $M^{2+}$ is $Mg^{2+}$ and/or $Zn^{2+}$, x is defined by $0.1<x<0.5$, and m is defined by $0<m<1$.

2. A stabilized halogen-containing resin composition according to claim 1, which further contains an organic tin compound or an organic acid metal salt.

3. A halogen-containing resin composition according to claim 2, wherein the organic tin compound or the organic acid metal salt is incorporated in an amount of 0.01 to 5 parts by weight per 100 parts by weight of the halogenated polymer of an ethylenically unsaturated monomer.

* * * * *